(12) United States Patent
Zhu et al.

(10) Patent No.: US 10,935,852 B2
(45) Date of Patent: Mar. 2, 2021

(54) DISPLAY PANEL AND DISPLAY DEVICE

(71) Applicant: BOE TECHNOLOGY GROUP CO., LTD., Beijing (CN)

(72) Inventors: Ming Zhu, Beijing (CN); Yuyao Wang, Beijing (CN); Feng Liao, Beijing (CN); Xiaochuan Chen, Beijing (CN); Xue Dong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/420,114

(22) Filed: May 22, 2019

(65) Prior Publication Data
US 2020/0150470 A1 May 14, 2020

(30) Foreign Application Priority Data

Nov. 9, 2018 (CN) .......................... 201811331236.8

(51) Int. Cl.
*G02F 1/1347* (2006.01)
*G02F 1/1335* (2006.01)
*G02F 1/13357* (2006.01)
*G02F 1/137* (2006.01)

(52) U.S. Cl.
CPC ............ *G02F 1/1347* (2013.01); *G02F 1/137* (2013.01); *G02F 1/133514* (2013.01); *G02F 1/133617* (2013.01)

(58) Field of Classification Search
CPC .. G02F 1/1347; G02F 1/133514; G02F 1/137; G02F 1/133617
USPC .......................................................... 349/61
See application file for complete search history.

(56) References Cited

U.S. PATENT DOCUMENTS

| | | | |
|---|---|---|---|
| 6,181,393 B1 * | 1/2001 | Enomoto | .......... G02F 1/133377 349/79 |
| 10,209,552 B2 | 2/2019 | Lan et al. | |
| 10,620,469 B2 | 4/2020 | Tan et al. | |
| 2020/0041827 A1 * | 2/2020 | Zhou | ..................... G02F 1/1334 |

FOREIGN PATENT DOCUMENTS

| | | |
|---|---|---|
| CN | 102830541 A | 12/2012 |
| CN | 105204216 A | 12/2015 |
| CN | 106292049 A | 1/2017 |
| WO | 2012070273 A1 | 5/2012 |

OTHER PUBLICATIONS

Office Action issued in corresponding Chinese Patent Application No. 201811331236.8, dated Dec. 15, 2020.

* cited by examiner

*Primary Examiner* — Nathanael R Briggs
*Assistant Examiner* — William D Peterson
(74) *Attorney, Agent, or Firm* — McDermott Will & Emery LLP (57) ABSTRACT

A display panel and a display device are provided, the display panel includes: a first substrate and a second substrate opposite to each other; a liquid crystal layer between the first substrate and the second substrate; a first electrode layer between the first substrate and the liquid crystal layer; and a second electrode layer between the second substrate and the liquid crystal layer, wherein the liquid crystal layer at least includes a first liquid crystal layer and a second liquid crystal layer stacked on each other, and a spiral direction of liquid crystal in the first liquid crystal layer is opposite to a spiral direction of liquid crystal in the second liquid crystal layer.

19 Claims, 5 Drawing Sheets

DISPLAY PANEL AND DISPLAY DEVICE

CROSS-REFERENCE TO RELATED APPLICATION

This application claims the benefit of Chinese Patent Application No. 201811331236.8 filed on Nov. 9, 2018 in the State Intellectual Property Office of China, the whole disclosure of which is incorporated herein by reference.

TECHNICAL FIELD

The present disclosure relates to the field of display technology, and in particular, to a display panel and a display device.

BACKGROUND

At present, liquid crystal display (LCD) devices of electronic devices such as mobile phones, tablet computers, smart watches and the like generally require two polarizers whose polarization directions are perpendicular to each other, so that light emitted from a white backlight source may be modulated by a liquid crystal layer. However, the transmittance of each polarizer is less than 50%, which significantly lowers the transmittance of the display device and results in a narrow color gamut. Therefore, in order to achieve a wide color gamut (such as Adobe RGB, DCI P3), the design of the existing display devices still needs to be improved

SUMMARY

Some embodiments of the present disclosure provide a display panel comprising: a first substrate and a second substrate opposite to each other; a liquid crystal layer between the first substrate and the second substrate; a first electrode layer between the first substrate and the liquid crystal layer; and a second electrode layer between the second substrate and the liquid crystal layer, wherein the liquid crystal layer at least comprises a first liquid crystal layer and a second liquid crystal layer stacked on each other, and a spiral direction of liquid crystal in the first liquid crystal layer is opposite to a spiral direction of liquid crystal in the second liquid crystal layer.

In some embodiments, the liquid crystal layer reflects a first color light in response to a case where no voltage is applied between the first electrode layer and the second electrode layer; the liquid crystal layer at least partially transmits the first color light in response to a case where a voltage is applied between the first electrode layer and the second electrode layer.

In some embodiments, the display panel further comprising: a color film layer between the second substrate and the second electrode, wherein the color film layer comprises: a first color film layer configured to transmit the first color light; a second color film layer configured to emit a second color light in response to the incident first color light; and a third color film layer configured to emit a third color light in response to the incident first color light; wherein the first color film layer, the second color film layer and the third color film layer are sequentially arranged in a direction parallel to the first substrate.

In some embodiments, the first color light comprises blue light, the second color light comprises one of red light or green light, and the third color light comprises the other one of the red light or the green light.

In some embodiments, the first color film layer comprises a transparent layer or a blue filter layer, the second color film layer comprises a red quantum dot layer or a red fluorescent dye layer, and the third color film layer comprises a green quantum dot layer or a green fluorescent dye layer, or the second color film layer comprises a green quantum dot layer or a green fluorescent dye layer, and the third color film layer comprises a red quantum dot layer or a red fluorescent dye layer.

In some embodiments, the liquid crystal in the first liquid crystal layer and the liquid crystal in the second liquid crystal layer are both cholesteric liquid crystal.

In some embodiments, the liquid crystal in the first liquid crystal layer comprises one of levorotary cholesteric liquid crystal or dextrorotary cholesteric liquid crystal, and the liquid crystal in the second liquid crystal layer comprises the other one of the levorotary cholesteric liquid crystal or the dextrorotary cholesteric liquid crystal.

In some embodiments, both the liquid crystal in the first liquid crystal layer and the liquid crystal in the second liquid crystal layer have a screw pitch of about 0.3 µm.

In some embodiments, a thickness of the first liquid crystal layer is M times the screw pitch, and a thickness of the second liquid crystal layer is N times the screw pitch, wherein each of M and N is a positive integer.

In some embodiments, M=N and M, N≥10.

In some embodiments, the liquid crystal layer has a thickness of 1 µm to 5 µm.

In some embodiments, the cholesteric liquid crystal has an extraordinary refractive index of 1.6 and an ordinary refractive index of 1.4.

In some embodiments, the display panel further comprising: a black matrix between any adjacent two of the first color film layer, second color film layer, and third color film layer.

In some embodiments, the first electrode layer comprises a first electrode, a second electrode, and a third electrode, the first electrode, the second electrode, and the third electrode being sequentially arranged in the direction parallel to the first substrate and spaced apart from each other, orthographic projections of the first electrode, the second electrode and the third electrode on the first substrate substantially coinciding with orthographic projections of the first color film layer, the second color film layer, and the third color film layer on the first substrate, respectively.

In some embodiments, the second electrode layer is a unitary and continuous electrode.

In some embodiments, each of the first color film layer, the second color film layer and the third color film layer has a thickness in a range of 100 nm to 500 nm.

In some embodiments, each of the first electrode layer and the second electrode layer has a thickness of 50 nm to 1500 nm.

In some embodiments, the blue light has a wavelength of 430 nm to 470 nm.

Some embodiments of the present disclosure provide a display device comprising the display panel in the above embodiments; and a backlight source on a side of the display panel adjacent to the first substrate.

In some embodiments, the backlight source is configured to emit a first color light toward the display panel.

BRIEF DESCRIPTION OF THE DRAWINGS

The above aspects of the disclosure will be explained in the description of the embodiments in conjunction with the following drawings.

DETAILED DESCRIPTION OF THE EMBODIMENTS

The embodiments of the present disclosure are described in detail below, and those skilled in the art will understand that the following embodiments are intended to explain the present disclosure and should not be construed as limiting the present disclosure. Unless specifically stated otherwise, in the following embodiments in which specific techniques or conditions are not explicitly described, those skilled in the art may carry out the embodiments according to commonly used techniques or conditions in the art or according to product specifications.

Some embodiments of the present disclosure provide a display panel including a first substrate and a second substrate disposed opposite to each other, a liquid crystal layer is disposed between the first substrate and the second substrate. A first electrode layer is disposed between the first substrate and the liquid crystal layer, and a second electrode layer is disposed between the second substrate and the liquid crystal layer. The liquid crystal layer at least includes a first liquid crystal layer and a second liquid crystal layer stacked on each other, and a spiral direction of liquid crystal in the first liquid crystal layer is opposite to a spiral direction of liquid crystal in the second liquid crystal layer, and the liquid crystal layer includes, for example, cholesteric liquid crystal.

The inventors have found that when non-polarized light is incident on the cholesteric liquid crystal, the spiral structure of the cholesteric liquid crystal divides the non-polarized light into levorotary circularly polarized light (counterclockwise rotation) and dextrorotary circularly polarized light (clockwise rotation), wherein the non-polarized light may be monochromatic light or natural light. And the spiral structure of the cholesteric liquid crystal may transmit one of the levorotary circularly polarized light and the dextrorotary circularly polarized light, and reflect the other one of the levorotary circularly polarized light and the dextrorotary circularly polarized light. For example, when the cholesteric liquid crystal is dextrorotary cholesteric liquid crystal, it may transmit the levorotary circularly polarized light and reflect the dextrorotary circularly polarized light; when the cholesteric liquid crystal is levorotary cholesteric liquid crystal, it can transmit the dextrorotary circularly polarized light and reflect the levorotary circularly polarized light. When a voltage is applied to the cholesteric liquid crystal, the spiral structure of the cholesteric liquid crystal is changed so that light incident on the cholesteric liquid crystal, such as polarized light or non-polarized light, may at least partially transmit through the cholesteric liquid crystal, and the degree of light transmission is positively correlated with the magnitude of the voltage applied to the cholesteric liquid crystal.

Based on the above principle, the first liquid crystal layer and the second liquid crystal layer stacked on each other are disposed in the display panel, and the spiral direction of the liquid crystal of the first liquid crystal layer is opposite to the spiral direction of the liquid crystal in the second liquid crystal layer, for example, one of the liquid crystal of the first liquid crystal layer and the liquid crystal in the second liquid crystal layer is levorotary cholesteric liquid crystal, and the other is dextrorotary cholesteric liquid crystal, and the first electrode layer and the second electrode layer controls the liquid crystal layer including the first liquid crystal layer and the second liquid crystal layer, so that the transmittance of the display panel for non-polarized light incident on the display panel can be controlled to realize display. The display panel having the above structure does not need to be provided with a polarizer, and may realize a wide color gamut (such as Adobe RGB, DCI P3).

Figure 1:
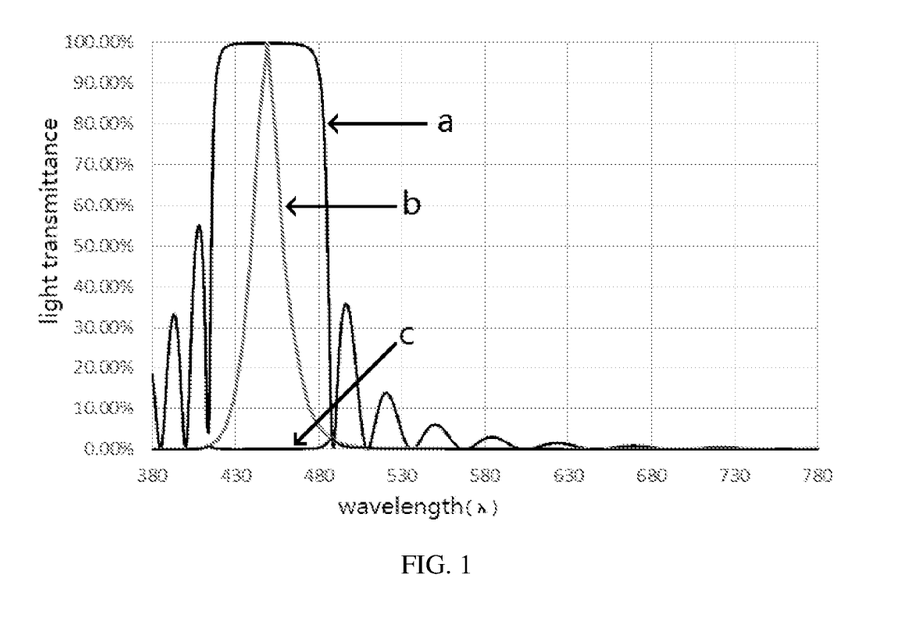
FIG. 1 is a chart showing simulation results of a reflectance spectrum of a cholesteric liquid crystal, a blue light spectrum, and a transmission spectrum of the cholesteric liquid crystal in a dark state.

FIG. 1 is a chart showing simulation results of a reflectance spectrum of a cholesteric liquid crystal, a blue light spectrum, and a transmission spectrum of the cholesteric liquid crystal in a dark state, wherein curve a in FIG. 1 is the reflectance spectrum curve of a double-layered cholesteric liquid crystal having a predetermined screw pitch; curve b is the blue light spectrum curve; and curve c is the transmission spectrum curve of the cholesteric liquid crystal in the dark state. The double-layered cholesteric liquid crystal in FIG. 1 includes levorotary cholesteric liquid crystal and dextrorotary cholesteric liquid crystal stacked on each other. During the research, the inventors found that, referring to FIG. 1, it can be seen from the simulation results that the reflectance spectrum of the double-layered cholesteric liquid crystal having the predetermined screw pitch (refer to the curve a in FIG. 1) and the blue light spectrum (refer to the curve b in FIG. 1) are very well matched to each other, the transmittance, for the blue light, of the cholesteric liquid crystal in the dark state (refer to the curve c in FIG. 1) is close to 0%. It can be seen that the double-layered cholesteric liquid crystal is more precise in the modulation of the blue light than in that of white light or other monochromatic light. Therefore, a blue backlight source is selected to provide backlight for the display panel and the liquid crystal layer is formed of the double-layered cholesteric liquid crystal, so that an output of the blue light may be accurately modulated, as a result, the display control function of the display panel may be well realized. In this way, it is not necessary to provide polarizers on both sides of the display panel, and the design of the polarizer is eliminated compared to the conventional liquid crystal display device, and the light transmission efficiency of the display panel can be greatly improved.

Figure 2:
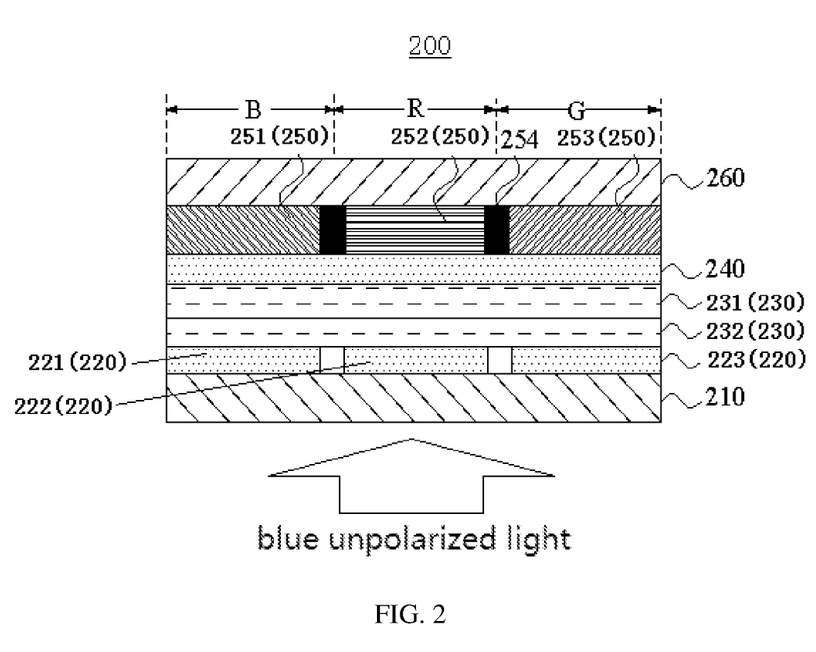
FIG. 2 is a schematic cross-sectional view of a display panel according to some embodiments of the present disclosure.

Some embodiments of the present disclosure provide a display panel, and FIG. 2 is a schematic cross-sectional view of a display panel according to some embodiments of the present disclosure. Referring to FIG. 2, a display panel 200 includes a first substrate 210 and a second substrate 260 disposed opposite to each other, and a liquid crystal layer 230 is disposed between the first substrate 210 and the second substrate 260. A first electrode layer 220 is disposed between the first substrate 210 and the liquid crystal layer 230, and a second electrode layer 240 is disposed between the second substrate 260 and the liquid crystal layer 230. The liquid crystal layer 230 includes a first liquid crystal layer 231 and a second liquid crystal layer 232 stacked on each other, and a spiral direction of liquid crystal in the first liquid crystal layer 231 is opposite to a spiral direction of liquid crystal in the second liquid crystal layer 232. In the embodiments, the liquid crystal in the first liquid crystal layer 231 is, for example, levorotary cholesteric liquid crystal, and the liquid crystal in the second liquid crystal layer 232 is, for example, dextrorotary cholesteric liquid crystal. The liquid crystal in the first liquid crystal layer 231 and the liquid crystal in the second liquid crystal layer 232 are different only in spiral direction, and have substantially identical screw pitch and other parameters. The display panel 200 receives backlight provided by an external light source, such as a backlight source, for display. The backlight, such as blue non-polarized light, is incident on a surface of the first substrate 210 away from the second substrate 260.

In the embodiments, the state of the cholesteric liquid crystal can be changed by controlling a voltage between the first electrode layer 220 and the second electrode layer 240 respectively disposed on both sides of the liquid crystal layer. For example, in response to an absence of voltage applied between the first electrode layer 220 and the second electrode layer 240, the liquid crystal in the first liquid crystal layer 231 and the liquid crystal in the second liquid crystal layer 232 maintain respective spiral states, and the blue non-polarized light passing through the first substrate 210 and being incident on the liquid crystal layer 230 is substantially completely reflected. In response to a predetermined voltage, such as a high voltage of 5 V, applied between the first electrode layer 220 and the second electrode layer 240, the respective spiral states of the liquid crystal in the first liquid crystal layer 231 and the liquid crystal in the second liquid crystal layer 232 are changed so that the liquid crystal layer 230 transmits most of the blue non-polarized light. When a voltage between the first electrode layer 220 and the second electrode layer 240 is between 0 V and the predetermined voltage, the respective spiral states of the liquid crystal in the first liquid crystal layer 231 and the liquid crystal in the second liquid crystal layer 232 are partially changed so that the liquid crystal layer 230 transmits a part of the blue non-polarized light. The transmittance for the blue non-polarized light is positively correlated with the voltage between the first electrode layer 220 and the second electrode layer 240. Thereby the display of the display panel is achieved.

In some embodiments, the display panel 200 further includes a color film layer 250, the color film layer 250 is disposed between the second substrate 260 and the second electrode layer 240 and used for implementing color display of the display panel. As shown in FIG. 2, the color film layer 250 includes a first color film layer 251, a second color film layer 252, and a third color film layer 253 which are sequentially arranged in a direction parallel to the first substrate 210. The first color film layer 251 is configured to transmit the first color light, such as blue light; the second color film layer 252 is configured to emit a second color light, such as red light, in response to the incident first color light; and the third color film layer 253 is configured to emit a third color light, such as green light, in response to the incident first color light. For convenience of description, the first color film layer 251, the second color film layer 252, and the third color film layer 253 may also be referred to as a blue color film layer 251, a red color film layer 252, and a green color film layer 253, respectively. The red color film layer 251, the green color film layer 252, and the blue color film layer 253 may be disposed in the same layer. The red color film layer 252 and the green color film layer 253 are photoluminescent layers, the red color film layer 252 emits red light under blue light excitation, and the green color film layer 253 emits green light under blue light excitation. In this way, the color display of the display panel is realized.

In some embodiments, the first electrode layer 220 is, for example, a pixel electrode layer, and the second electrode layer 240 is, for example, a common electrode layer. The first electrode layer 220 includes a first electrode 221, a second electrode 222, and a third electrode 223 which are sequentially arranged in the direction parallel to the first substrate 210 and spaced apart from each other. The first electrode 221, the second electrode 222, and the third electrode 223 corresponds to the blue color film layer 251, the red color film layer 252 and the green color film layer 253, respectively. Orthographic projections of the first electrode 221, the second electrode 222 and the third electrode 223 on the first substrate 210 substantially coincide with orthographic projections of the blue color film layer respectively 251, the red color film layer 252 and the green color film layer 253 on the first substrate 210, respectively, to form a blue sub-pixel B, a red sub-pixel R, and a green sub-pixel G. The blue sub-pixel B, the red sub-pixel R, and the green sub-pixel G constitute one pixel unit. The second electrode layer 240 may be a unitary and continuous electrode. As the common electrode, the second electrode layer 240 substantially covers the first substrate 210. A voltage between the second electrode layer 240 and each of the first electrode 221, the second electrode 222, and the third electrode 223 is controlled to control the transmittance, for the blue light, of the liquid crystal in a corresponding sub-pixel, so that different sub-pixels may have different brightness.

It should be noted that "blue light" as used in the present disclosure refers to blue non-polarized light having a wavelength in a range of from 400 nm to 480 nm, and the blue backlight source 100 that provides backlight for the display panel 200 emits blue non-polarized light. It should be noted that only one pixel unit in the display panel is illustrated in FIG. 1. According to some embodiments of the present disclosure, the display panel 200 may include a plurality of pixel units arranged in an array, the specific number is not particularly limited, and those skilled in the art may design correspondingly according to the actual display pixel resolution of the display device, and details are not described herein again.

In some embodiments of the present disclosure, referring to FIG. 2, the display panel 200 may include a black matrix 254 disposed between any adjacent two of the blue color film layer 251, the red color film layer 252, and the green color film layer 253, that is, the black matrix 254 is disposed between the color film layers of different sub-pixels. In this way, the problem of crosstalk between different sub-pixels can be effectively avoided, thereby making the display panel have a good display effect.

According to some embodiments of the present disclosure, the cholesteric liquid crystal in the liquid crystal layer 230 including the first liquid crystal layer 231 and the second liquid crystal layer 232 may have an extraordinary refractive index (ne) of 1.6 and an ordinary refractive index (no) of 1.4, and have a screw pitch of about 0.3 μm. The cholesteric liquid crystal in the first liquid crystal layer 231 and the cholesteric liquid crystal in the second liquid crystal layer 232 may be different only in the spiral direction. For example, the liquid crystal in the first liquid crystal layer 231 is levorotary cholesteric liquid crystal and the liquid crystal in the second liquid crystal layer 232 is dextrorotary cholesteric liquid crystal. Thus, by using the liquid crystal layer 230 described above, the light output of the blue light having a wavelength of 400 nm to 480 nm can be more accurately modulated. In some embodiments of the present disclosure, a thickness of the first liquid crystal layer 231 is M times the screw pitch, and a thickness of the second liquid crystal layer 232 is N times the screw pitch, and each of M, N is a positive integer, for example, M, N≥10. In this case, the blue non-polarized light incident on the first liquid crystal layer 231 may be divided into blue levorotary circularly polarized light and blue dextrorotary circularly polarized light. The blue levorotary circularly polarized light incident on the first liquid crystal layer 231 may be substantially completely reflected by the first liquid crystal layer 231, and the dextrorotary circularly polarized light which passes through the first liquid crystal layer 231 and is incident on the second liquid crystal layer 232 may be substantially completely reflected by the second liquid crystal layer 232. Therefore, a good dark state effect can be achieved, resulting in a high contrast of the display panel.

Figure 3:
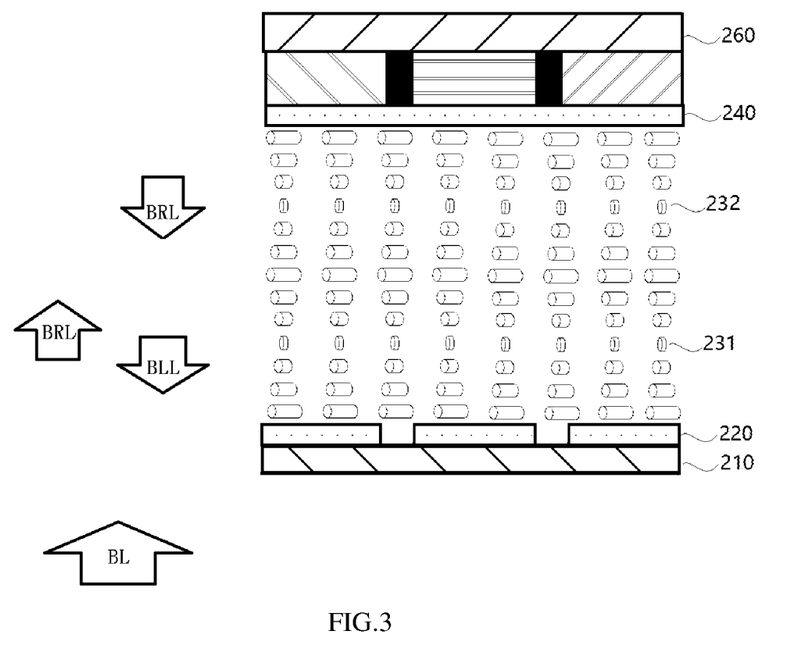
FIG. 3 is a schematic diagram showing a display principle of a display panel in a dark state, according to some embodiments of the present disclosure.

FIG. 3 is a schematic diagram showing a display principle of a display panel in a dark state according to some embodiments of the present disclosure. As shown in FIG. 3, no voltage is applied between the first electrode layer 220 and the second electrode layer 240, and there is no electric field between the first electrode layer 220 and the second electrode layers 240, the liquid crystal layer 230 layer is not driven by electric field, so that the levorotary cholesteric liquid crystal in the first liquid crystal layer 231 and the dextrorotary cholesteric liquid crystal in the second liquid crystal layer 232 maintain respective spiral states. The levorotary cholesteric liquid crystal in the first liquid crystal layer 231 is in a counterclockwise spiral state, and the dextrorotary cholesteric liquid crystal in the second liquid crystal layer 232 is in a clockwise spiral state. In this case, the blue non-polarized light BL incident on the first liquid crystal layer 231 can be divided into blue levorotary circularly polarized light BLL and blue dextrorotary circularly polarized light BRL. The blue levorotary circularly polarized light BLL incident on the first liquid crystal layer 231 may be substantially completely reflected by the first liquid crystal layer 231, and the blue dextrorotary circularly polarized light BRL which passes through the first liquid crystal layer 231 and is incident on the second liquid crystal layer 232 may be substantially completely reflected by the second liquid crystal layer 232, thereby achieving a dark state.

Figure 4:
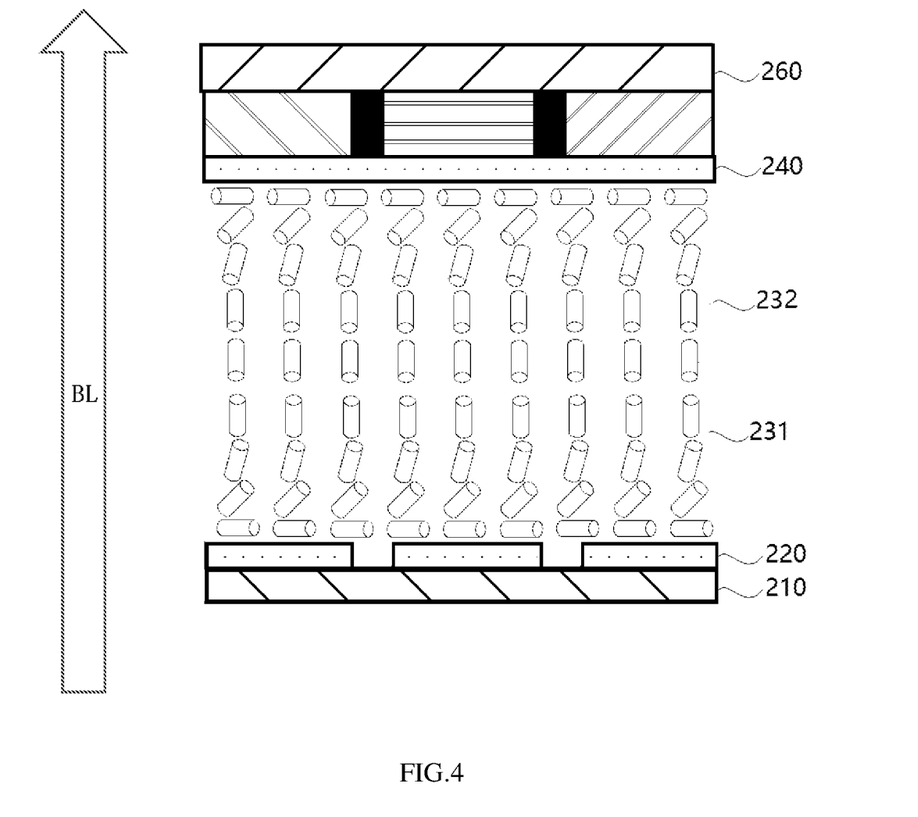
FIG. 4 is a schematic diagram showing a display principle of a display panel in a bright state, according to some embodiments of the present disclosure.

FIG. 4 is a schematic diagram showing a display principle of a display panel in a bright state according to some embodiments of the present disclosure. As shown in FIG. 4, a voltage, such as a predetermined voltage, is applied between the first electrode layer 220 and the second electrode layer 240. A vertical electric field is generated between the first electrode layer 220 and the second electrode layer 240. The liquid crystal layer 230 layer is driven by the electric field. The respective spiral states of the levorotary cholesteric liquid crystal in the first liquid crystal layer 231 and the dextrorotary cholesteric liquid crystal in the second liquid crystal layer 232 are changed, so that both the levorotary cholesteric liquid crystal in the first liquid crystal layer 231 and the dextrorotary cholesteric liquid crystal in the second liquid crystal layer 232 are in an upright state as shown in FIG. 4. In this case, the blue non-polarized light BL incident on the first liquid crystal layer 231 may pass through the first liquid crystal layer 231 and the second liquid crystal layer 232, thereby achieving a bright state.

The foregoing embodiments are described by taking the liquid crystal layer 230 including a double-layered cholesteric liquid crystal as an example. In some embodiments, the liquid crystal layer may further include a plurality of layers of cholesteric liquid crystal. Specifically, the liquid crystal layer includes a plurality of layers of cholesteric liquid crystal stacked on each other. The liquid crystal in at least parts of the layers of cholesteric liquid crystal is levorotary cholesteric liquid crystal, and the liquid crystal in the others of the layers of cholesteric liquid crystal is dextrorotary cholesteric liquid crystal. It is also possible to achieve a display panel that does not require polarizers.

According to some embodiments of the present disclosure, the specific thickness of the liquid crystal layer 230 may be from 1 µm to 5 µm. Thus, the liquid crystal layer 230 having the above-mentioned thickness may have a precise modulation effect on the reflection or transmission of the blue light. According to some embodiments of the present disclosure, a central wavelength of the blue light emitted by the blue backlight source 100 may specifically be 430 nm to 470 nm. Thus, for the blue light in the above wavelength range, a specific type of cholesteric liquid crystal is selected to form the liquid crystal 230 having a suitable thickness, so that the display function of the display device may be more precise.

According to some embodiments of the present disclosure, the blue color film layer 251 in the blue sub-pixel B is a colorless transparent film layer or a blue color filter layer, and the red color film layer 252 in the red sub-pixel R may be a red quantum dot layer or a red fluorescent dye layer which may excite red light under the illumination of blue light, and the green color film layer 253 in the green sub-pixel G may be a green quantum dot layer or a green fluorescent dye layer which may excite green light under the illumination of blue light. In this case, in the blue sub-pixel, the blue light passing through the liquid crystal layer 230 may be transmitted through the blue color filter layer 251 and the second substrate 260. In the red sub-pixel R, the red color film layer 252 may convert the blue light passing through the liquid crystal layer 230 into red light and then the red light may be transmitted through the second substrate 260. In the green sub-pixel G, the green color film layer 253 may convert the blue light passing through the liquid crystal layer 230 into green light and then the green light may be transmitted through the second substrate 260d. Therefore, the color display is realized.

According to some embodiments of the present disclosure, each of the blue color film layer 251, the red color film layer 252, and the green color film layer 253 has a thickness in a range of 100 nm to 500 nm. Thus, the red color film layer 252 and the green color film layer 253 having the above thickness may fully convert the blue light emitted by the blue backlight source 100 into red light and green light, respectively, so that the display panel has high light output efficiency as well as rich chromaticity. According to the embodiments of the present disclosure, the specific thicknesses of the red color film layer 252 and the green color film layer 253 may be correspondingly designed and adjusted by those skilled in the art according to the specific material and the actual light conversion effect, and details are not described herein again.

According to some embodiments of the present disclosure, in the display panel, the first electrode layer 220 and the second electrode layer 240 may both be formed of indium tin oxide (ITO), so that the display device has a good light transmission effect by using the transparent conductive first electrode 220 and the transparent conductive second electrode 240, thereby improving backlight utilization rate. In some embodiments of the present disclosure, the thicknesses of the first electrode 220 and the second electrode 240 are about from 50 nm to 1500 nm. Thus, a uniform vertical electric field may be applied to the liquid crystal layer 230 by using the two electrode layers having the above thicknesses. Thereby, the precise modulation of the blue light by the liquid crystal layer 230 is achieved.

In some embodiments, the display panel may further include alignment layers such as a first alignment layer disposed between the liquid crystal layer 230 and the first electrode layer 220 and a second alignment layer disposed between the liquid crystal layer 230 and the second electrode layer 240, which is not specifically limited herein.

Figure 5:
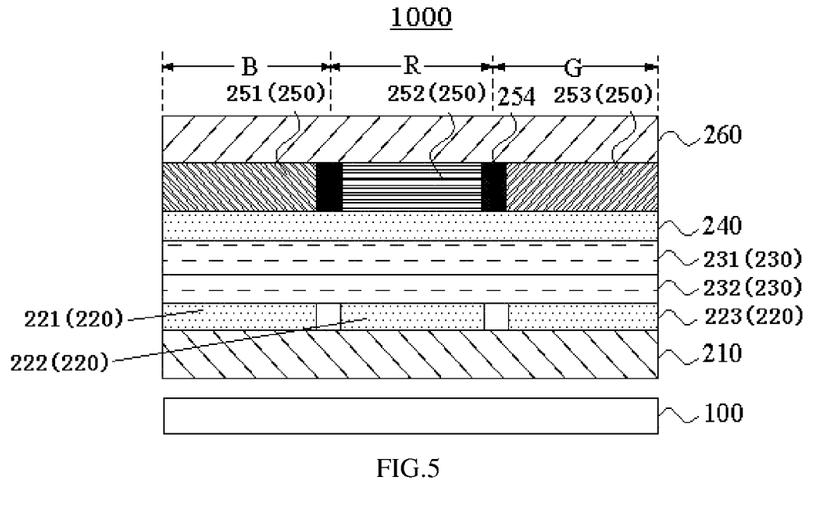
FIG. 5 is a schematic cross-sectional view of a display device according to some embodiments of the present disclosure.

Some embodiments of the present disclosure provide a display device, and FIG. 5 illustrates a schematic cross-sectional view of a display device according to some embodiments of the present disclosure. As shown in FIG. 5, the display device 1000 includes the display panel 200 described in the foregoing embodiments and a backlight source 100, the backlight source 100 is disposed on a side of the display panel 200 close to the first substrate 210, and faces the first substrate 210. The backlight source 100 is configured to emit a first color light, such as blue light, toward the display panel.

According to some embodiments of the present disclosure, the specific type of the display device is not particularly limited, the display device may be such as a display screen, a television, a mobile phone, a tablet computer, or a smart watch, etc. . . . . The specific type of the display device may be correspondingly selected by those skilled in the art according to actual needs, which is not specifically limited herein. It should be noted that, in addition to the display panel and the blue backlight source, the display device further includes other necessary components and structures, taking the display screen as an example, the other necessary components and structures, such as, a casing, a control circuit board or a power line, etc. may be supplemented by those skilled in the art according to the function of the display device, and details are not described herein again.

In summary, according to some embodiment of the present disclosure, the present disclosure provides a display panel and a display device, wherein a liquid crystal layer formed of cholesteric liquid crystal has a more precise modulation effect on blue light than white light. Thus, it is possible to control the light output of the display device without setting polarizers on both sides of the display panel, thereby greatly improving the light output efficiency of the display device.

In the description of the present disclosure, it is to be understood that the orientations or positional relationships indicated by the terms such as "center", "longitudinal", "transverse", "length", "width", "thickness", "upper", "lower", "front", "rear", "left", "right", "vertical", "horizontal", "top", "bottom", "inside", "outside", "clockwise", "counterclockwise", "axial", "radial", "circumferential" or the like, are based on the orientations or positional relationships shown in the drawings. They are merely for the convenience of describing the present disclosure and the simplified description, and do not indicate or imply the indicated device or the elements must have a particular orientation, or be constructed and operated in a particular orientation, and thus they are not to be construed as limiting the disclosure.

Moreover, the terms "first" and "second" are used for descriptive purposes only and are not to be construed as indicating or implying a relative importance or implicitly indicating the number of technical features indicated. Thus, features defined by "first" or "second" may explicitly or implicitly include at least one of the features. In the description of the present disclosure, the meaning of "a plurality" is at least two, such as two, three, etc., unless specifically defined otherwise.

In the description of the present specification, the description with reference to the terms "one embodiment", "some embodiments", "example", "specific example", "some examples" or the like means specific features, structures, materials, or characteristics described in connection with the embodiment or examples are included in at least one embodiment or example of the present disclosure. In the present specification, the schematic representation of the above terms is not necessarily directed to the same embodiment or example. Furthermore, the particular features, structures, materials, or characteristics described may be combined in a suitable manner in any one or more embodiments or examples. In addition, various embodiments or examples described in the specification, as well as features of various embodiments or examples, may be combined.

While the embodiments of the present disclosure have been shown and described above, it is understood that the foregoing embodiments are illustrative and are not to be construed as limiting the scope of the disclosure. Variations, modifications, alterations and changes of the above-described embodiments may be made by those skilled in the art within the scope of the present disclosure.

What is claimed is:

1. A display panel comprising:
a first substrate and a second substrate opposite to each other;
a liquid crystal layer between the first substrate and the second substrate;
a first electrode layer between the first substrate and the liquid crystal layer; and
a second electrode layer between the second substrate and the liquid crystal layer,
wherein the liquid crystal layer at least comprises a first liquid crystal layer and a second liquid crystal layer stacked on each other, and a spiral direction of liquid crystal in the first liquid crystal layer is opposite to a spiral direction of liquid crystal in the second liquid crystal layer, and
wherein the liquid crystal layer reflects a first color light in response to a case where no voltage is applied between the first electrode layer and the second electrode layer, the liquid crystal layer at least partially transmits the first color light in response to a case where a voltage is applied between the first electrode layer and the second electrode layer.

2. The display panel of claim 1, further comprising:
a color film layer between the second substrate and the second electrode,
wherein the color film layer comprises:
a first color film layer configured to transmit the first color light;
a second color film layer configured to emit a second color light in response to the incident first color light; and
a third color film layer configured to emit a third color light in response to the incident first color light;
wherein the first color film layer, the second color film layer and the third color film layer are sequentially arranged in a direction parallel to the first substrate.

3. The display panel of claim 2, wherein the first color light comprises blue light, the second color light comprises one of red light or green light, and the third color light comprises the other one of the red light or the green light.

4. The display panel of claim 3, wherein the first color film layer comprises a transparent layer or a blue filter layer, the second color film layer comprises a red quantum dot layer or a red fluorescent dye layer, and the third color film layer comprises a green quantum dot layer or a green fluorescent dye layer, or
the second color film layer comprises a green quantum dot layer or a green fluorescent dye layer, and the third color film layer comprises a red quantum dot layer or a red fluorescent dye layer.

5. The display panel of claim 1, wherein the liquid crystal in the first liquid crystal layer and the liquid crystal in the second liquid crystal layer are both cholesteric liquid crystal.

6. The display panel of claim 5, wherein the liquid crystal in the first liquid crystal layer comprises one of levorotary cholesteric liquid crystal or dextrorotary cholesteric liquid crystal, and the liquid crystal in the second liquid crystal layer comprises the other one of the levorotary cholesteric liquid crystal or the dextrorotary cholesteric liquid crystal.

7. The display panel of claim 5, wherein both the liquid crystal in the first liquid crystal layer and the liquid crystal in the second liquid crystal layer have a screw pitch of about 0.3 μm.

8. The display panel of claim 7, wherein a thickness of the first liquid crystal layer is M times the screw pitch, and a thickness of the second liquid crystal layer is N times the screw pitch, wherein each of M and N is a positive integer.

9. The display panel of claim 8, wherein M=N and M, N≥10.

10. The display panel of claim 8, wherein the liquid crystal layer has a thickness of 1 μm to 5 μm.

11. The display panel of claim 5, wherein the cholesteric liquid crystal has an extraordinary refractive index of 1.6 and an ordinary refractive index of 1.4.

12. The display panel of claim 2, further comprising:
a black matrix between any adjacent two of the first color film layer, second color film layer, and third color film layer.

13. The display panel of claim 2, wherein the first electrode layer comprises a first electrode, a second electrode, and a third electrode, the first electrode, the second electrode, and the third electrode being sequentially arranged in the direction parallel to the first substrate and spaced apart from each other, orthographic projections of the first electrode, the second electrode and the third electrode on the first substrate substantially coinciding with orthographic projections of the first color film layer, the second color film layer, and the third color film layer on the first substrate, respectively.

14. The display panel of claim 2, wherein the second electrode layer is a unitary and continuous electrode.

15. The display panel of claim 2, wherein each of the first color film layer, the second color film layer and the third color film layer has a thickness in a range of 100 nm to 500 nm.

16. The display panel of claim 1, wherein each of the first electrode layer and the second electrode layer has a thickness of 50 nm to 1500 nm.

17. The display panel of claim 3, wherein the blue light has a wavelength of 430 nm to 470 nm.

18. A display device comprising:
the display panel of claim 1; and
a backlight source on a side of the display panel adjacent to the first substrate.

19. The display device of claim 18, wherein the backlight source is configured to emit a first color light toward the display panel.

* * * * *